(12) United States Patent
Oto

(10) Patent No.: US 9,845,784 B2
(45) Date of Patent: Dec. 19, 2017

(54) MOTORCYCLE

(71) Applicant: HONDA MOTOR CO., LTD., Tokyo (JP)

(72) Inventor: Hiroaki Oto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 15/068,895

(22) Filed: Mar. 14, 2016

(65) Prior Publication Data

US 2016/0273460 A1 Sep. 22, 2016

(30) Foreign Application Priority Data

Mar. 20, 2015 (JP) ................................. 2015-057667

(51) Int. Cl.
| | |
|---|---|
| *F02P 5/02* | (2006.01) |
| *F02M 35/04* | (2006.01) |
| *F02M 35/16* | (2006.01) |
| *B62M 7/02* | (2006.01) |
| *B62J 37/00* | (2006.01) |
| *B62J 23/00* | (2006.01) |

(52) U.S. Cl.
CPC ................. *F02P 5/02* (2013.01); *B62J 37/00* (2013.01); *B62M 7/02* (2013.01); *F02M 35/044* (2013.01); *F02M 35/162* (2013.01); *B62J 23/00* (2013.01)

(58) Field of Classification Search
CPC ......... F02P 5/02; F02M 35/04; F02M 35/044; F02M 35/162; B62J 37/00; B62J 23/00; B62M 7/02
See application file for complete search history.

(56) References Cited

U.S. PATENT DOCUMENTS

| | | | | |
|---|---|---|---|---|
| 7,681,551 B2* | 3/2010 | Konno | ............. | F02M 35/10085 123/400 |
| 8,607,918 B2* | 12/2013 | Mori | ........................ | B60K 5/04 180/219 |
| 2014/0174394 A1 | 6/2014 | Shimomura et al. | | |

FOREIGN PATENT DOCUMENTS

| | | |
|---|---|---|
| EP | 1520978 A2 | 4/2005 |
| EP | 1593836 A1 | 11/2005 |
| JP | 2007-177682 A | 7/2007 |

* cited by examiner

*Primary Examiner* — Hieu T Vo
(74) *Attorney, Agent, or Firm* — Birch, Stewart, Kolasch & Birch, LLP

(57) ABSTRACT

A motorcycle including a protection cover for a throttle body that is less likely to contribute to an increase in the vehicle weight to thus improve the attachability thereof. A motorcycle includes a throttle body provided with a throttle valve for controlling a flow rate of intake air into an internal combustion engine and an air cleaner for supplying air to the throttle body. The throttle body is arranged at a rear of the air cleaner with an intake port of the internal combustion engine being arranged at a rear of the throttle body. The air cleaner includes a throttle body protecting section for covering at least a lower surface of the throttle body.

20 Claims, 10 Drawing Sheets

MOTORCYCLE

CROSS-REFERENCE TO RELATED APPLICATIONS

The present application claims priority under 35 USC 119 to Japanese Patent Application No. 2015-057667 filed Mar. 20, 2015 the entire contents of which are hereby incorporated by reference.

BACKGROUND OF THE INVENTION

1. Field of the Invention

The present invention relates to a motorcycle and in particular to protection of a throttle body.

2. Description of Background Art

A motorcycle is known wherein front, rear, left, and right sides of a throttle body (25) are covered with a protection cover (C) for the purpose of protecting the throttle body (25) from a flying object. See, for example, JP-A-2007-177682.

In the above-described conventional motorcycle, the protection cover (C) serves as a structure for covering the front, rear, left, and right sides of the throttle body (25) and is constructed as an independent component from the other components. Thus, the protection cover (C) contributes to an increase in the vehicle weight. Further, there is difficulty in attaching the cover.

SUMMARY AND OBJECTS OF THE INVENTION

A problem solved by an embodiment of the present invention is to provide a motorcycle in which a protection cover of a throttle body is less likely to contribute to an increase in a vehicle weight. Thus, the attachability thereof is also improved.

According to an embodiment of the present invention, a motorcycle of the invention includes:

a throttle body that is provided with a throttle valve for controlling a flow rate of intake air into an internal combustion engine; and an air cleaner for supplying air to the throttle body, wherein the throttle body is arranged at a rear of the air cleaner with an intake port of the internal combustion engine being arranged at a rear of the throttle body, and the air cleaner includes a throttle body protecting section for covering at least a lower surface of the throttle body.

According to an embodiment of the present invention, the throttle body is arranged at the rear of the air cleaner, and the air cleaner includes the throttle body protecting section for covering at least the lower surface of the throttle body. Thus, a front side of the throttle body can be protected by the air cleaner, and a lower side thereof can be protected by the throttle body protecting section that is provided in the air cleaner.

According to an embodiment of the present invention, the throttle body can be protected by the air cleaner with the throttle body protecting section. Thus, differing from the conventional art, there is no need to prepare the protection cover as an independent component.

According to an embodiment of the present invention, the protection cover of the throttle body is less likely to contribute to an increase in a vehicle weight. In addition, because only the air cleaner has to be attached to a vehicle body, attachability of the protection cover is improved.

According to an embodiment of the present invention, the motorcycle includes the throttle body protecting section that is configured to be in a U-shape in a rear view that has a bottom wall for covering the lower surface of the throttle body; and side walls that respectively extend upwardly from the left and right of the bottom wall and cover left and right sides of the throttle body with an upper side and a rear side thereof that are opened.

According to an embodiment of the present invention, while the left and right sides of the throttle body can respectively be protected by the side walls of the throttle body protecting section, the upper side and the rear side of the throttle body protecting section are opened. Thus, after the throttle body is assembled to the vehicle, the air cleaner can also be assembled by using opened sections.

According to an embodiment of the present invention, the motorcycle includes the throttle body having a throttle drum for actuating the throttle valve in a side section. The throttle drum is arranged to be projected to a side of the air cleaner in the rear view, and the throttle body protecting section has a front wall for protecting a front section of the throttle drum.

According to an embodiment of the present invention, while a capacity of the air cleaner can easily be secured by projecting the throttle drum in the side section of the throttle body to the side of the air cleaner in the rear view, the throttle drum can be protected by the throttle body protecting section.

According to an embodiment of the present invention, the motorcycle can be configured that a connection section to an intake passage of the throttle body that is provided in a rear surface of the air cleaner.

According to an embodiment of the present invention, the intake passage of the throttle body can directly be connected to the air cleaner. Thus, the intake of the air can be smoothed.

According to an embodiment of the present invention, the motorcycle includes the throttle body protecting section that can be configured to have, on an outer circumferential surface of the throttle body protecting section, a wire positioning section for positioning a high-voltage wire that leads to an ignition coil.

According to an embodiment of the present invention, the high-voltage wire, which leads to the ignition coil, can be prevented from contacting the other components.

According to an embodiment of the present invention, the motorcycle includes the wire positioning section that can be configured to be provided at a position that is in front of the ignition coil and is separated from the ignition coil.

According to an embodiment of the present invention, a state where the high-voltage wire is bent immediately after being drawn out of the ignition coil can be prevented. Thus, application of a load on the ignition coil can be restricted.

According to an embodiment of the present invention, the motorcycle includes the wire positioning section that can be configured to have a rib that is provided over an upper end and a lower end of the outer circumferential surface of the throttle body protecting section.

According to an embodiment of the present invention, the high-voltage wire can be positioned in a manner to stretch vertically and thus can further reliably be positioned.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
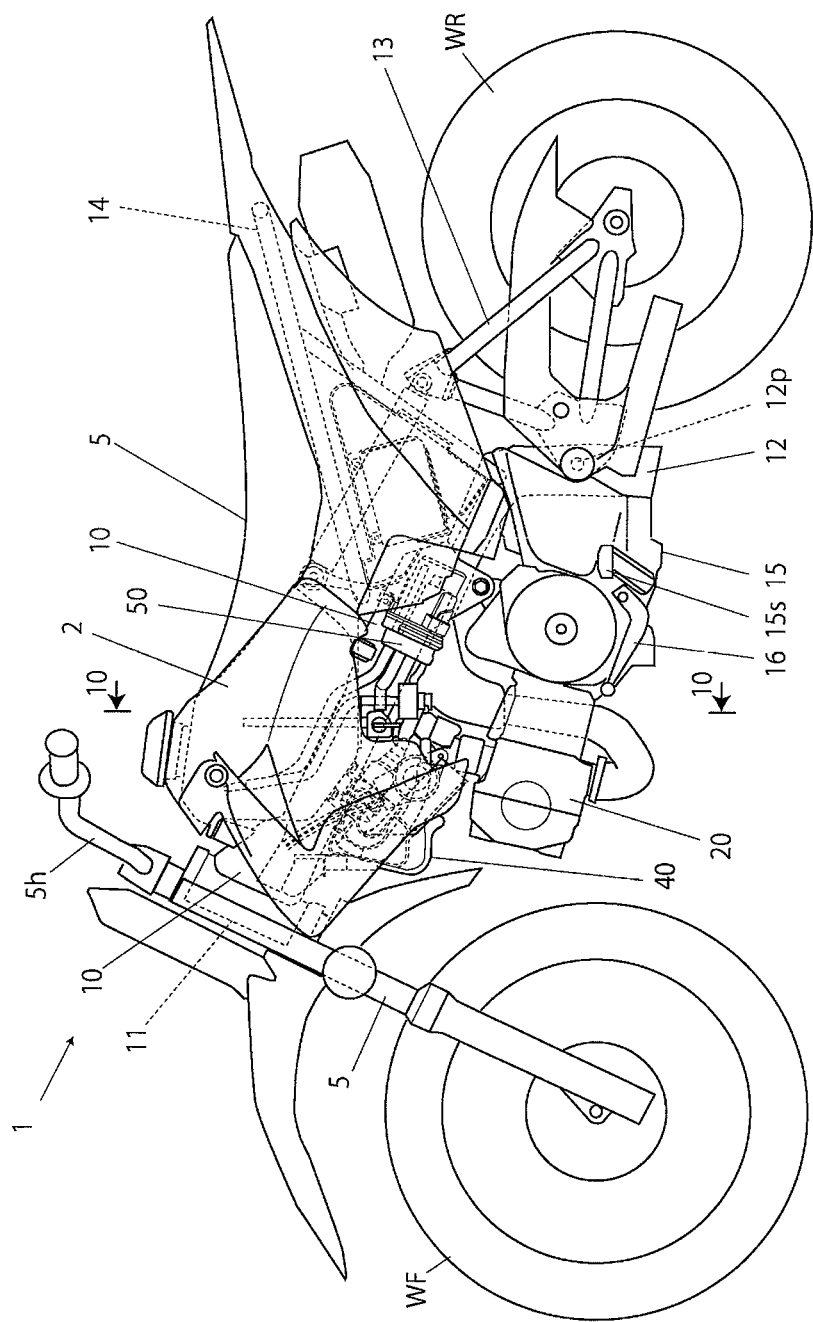
FIG. 1 is a left side view of an embodiment of a motorcycle according to the invention.

A description will hereinafter be made of an embodiment of a motorcycle according to an embodiment of the present invention with reference to the drawings. It should be noted that the drawings are seen in a direction that the reference numerals are provided. In the following description, front/rear, left/right, and up/down follow directions are seen from a driver and are indicated in the drawings upon necessary such that front, rear, left, right, up, and down of a vehicle are respectively indicated as Fr, Rr, L, R, U, and D. In each of the drawings, the same portions or equivalent portions are denoted by the same reference numerals.

As depicted in FIGS. 1, 4, 5, and 10, a motorcycle 1 of this embodiment includes a throttle body 30 that is provided with a throttle valve 31 for controlling a flow rate of intake air into an internal combustion engine 20 and an air cleaner 40 for supplying the air to the throttle body 30.

Figure 4:
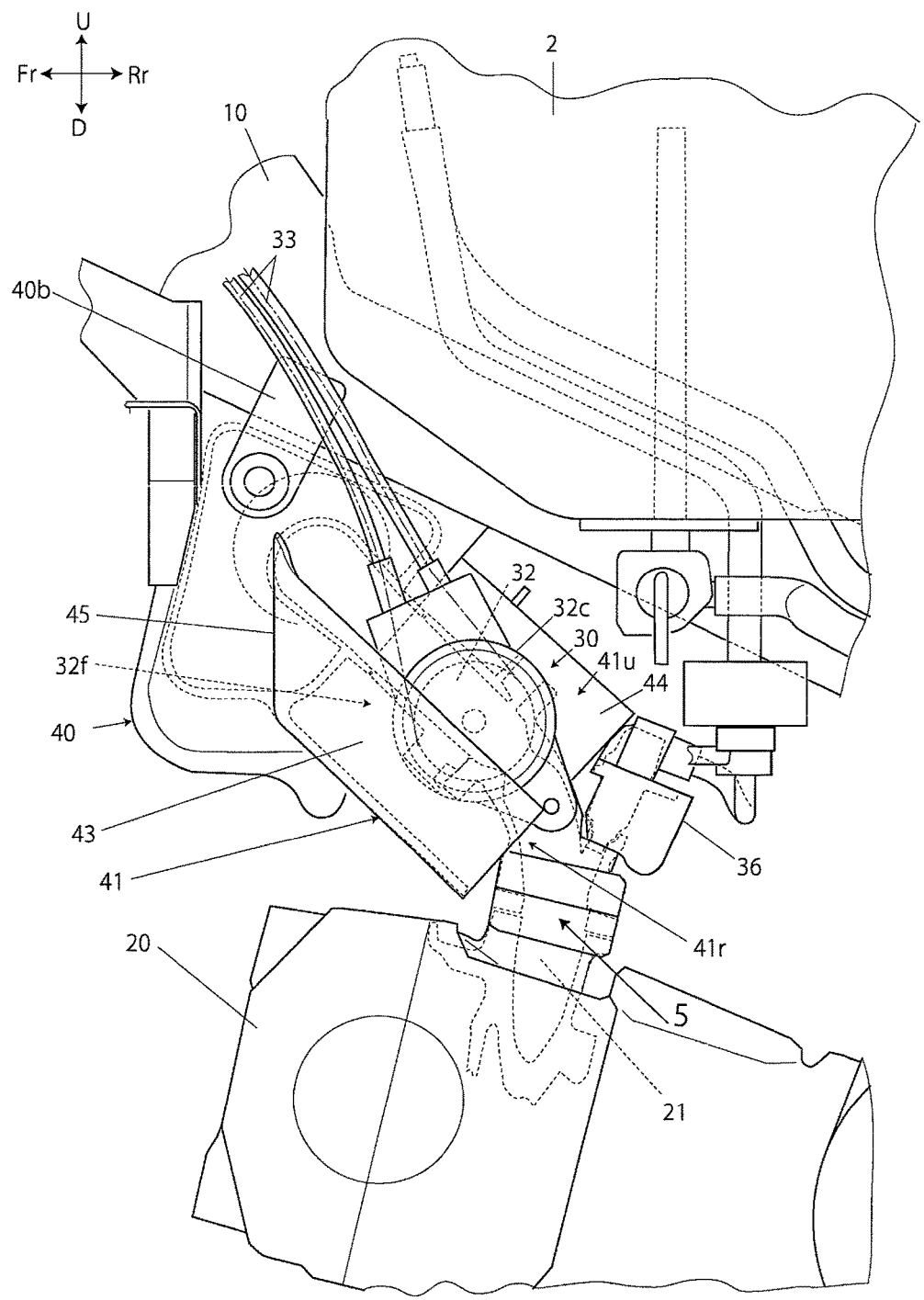
FIG. 4 is a partially enlarged view of FIG. 3.
Figure 5:
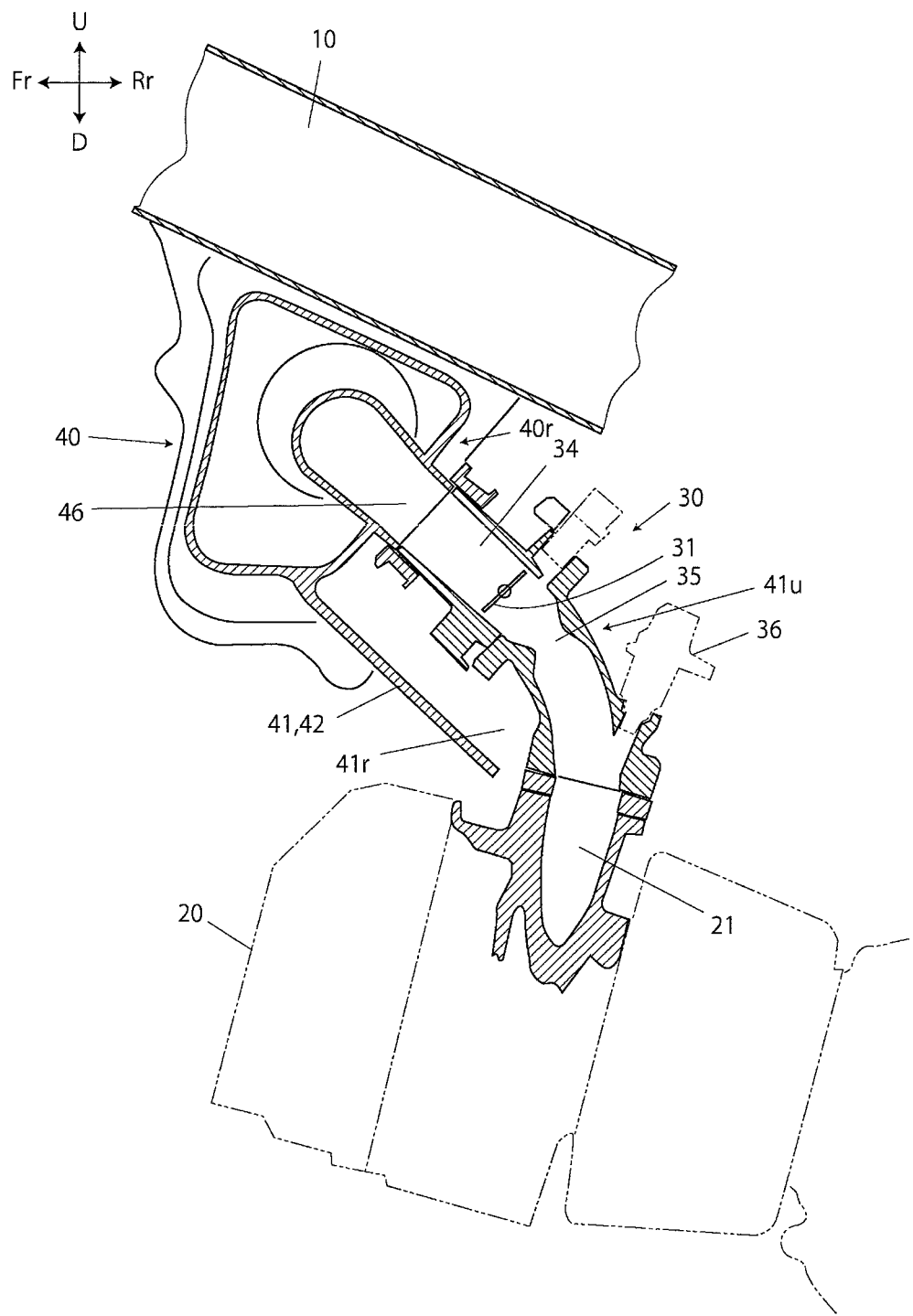
FIG. 5 is a cross-sectional view of a main section.

As depicted in FIGS. 4 and 5, the throttle body 30 is arranged at a rear of the air cleaner 40, and an intake port 21 of the internal combustion engine 20 is arranged at a rear of the throttle body 30. The air cleaner 40 includes a throttle body protecting section 41 for covering at least a lower surface of the throttle body 30.

According to this motorcycle, the throttle body 30 is arranged at the rear of the air cleaner 40, the intake port 21 of the internal combustion engine 20 is arranged at the rear of the throttle body 30, and the air cleaner 40 includes the throttle body protecting section 41 for covering at least the lower surface of the throttle body 30. Accordingly, a front side of the throttle body 30 can be protected by the air cleaner 40 (depicted is a rear wall (40r) of the air cleaner), and a lower side thereof can be protected by the throttle body protecting section 41 that is provided in the air cleaner 40.

More specifically, according to this motorcycle, the throttle body 30 can be protected by the air cleaner 40 with the throttle body protecting section 41. Thus, differing from the conventional art, there is no need to prepare the protection cover as an independent component.

Accordingly, the protection cover of the throttle body 30 is less likely to contribute to an increase in the vehicle weight. In addition, because only the air cleaner 40 has to be attached to a vehicle body, the attachability of the protection cover is improved.

As depicted in FIGS. 4 to 10, the throttle body protecting section 41 is in a U-shape in a rear view that has a bottom wall 42 for covering the lower surface of the throttle body 30; and side walls 43, 44 that respectively extend upwardly from the left and the right of the bottom wall 42 and cover the left and right sides of the throttle body 30, and an upper side 41u and a rear side 41r thereof are opened.

While the left and right sides of the throttle body 30 can respectively be protected by the side walls 43, 44 of the throttle body protecting section 41, the upper side 41u and the rear side 41r of the throttle body protecting section 41 are opened. Thus, after the throttle body 30 is assembled to the vehicle, the air cleaner 40 can also be assembled by using the above opened sections 41u, 41r.

Figure 6:
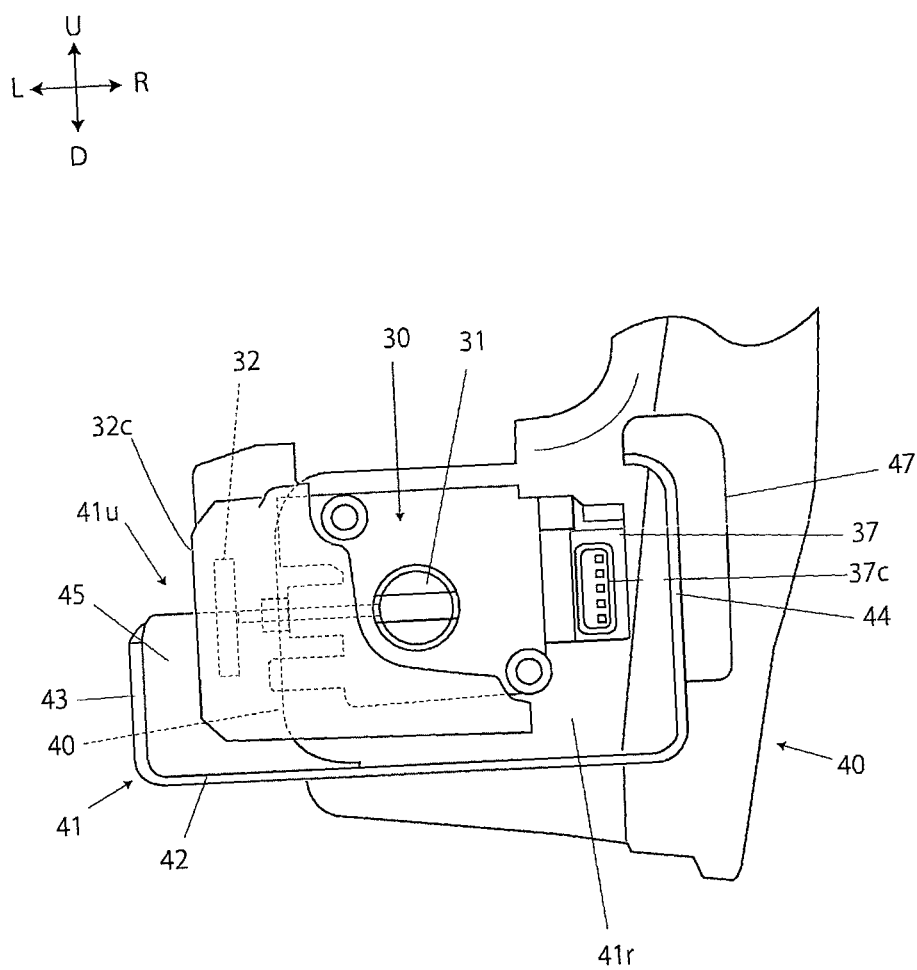
FIG. 6 is a view that is seen from an arrow 5 direction in FIG. 4.
Figure 7:
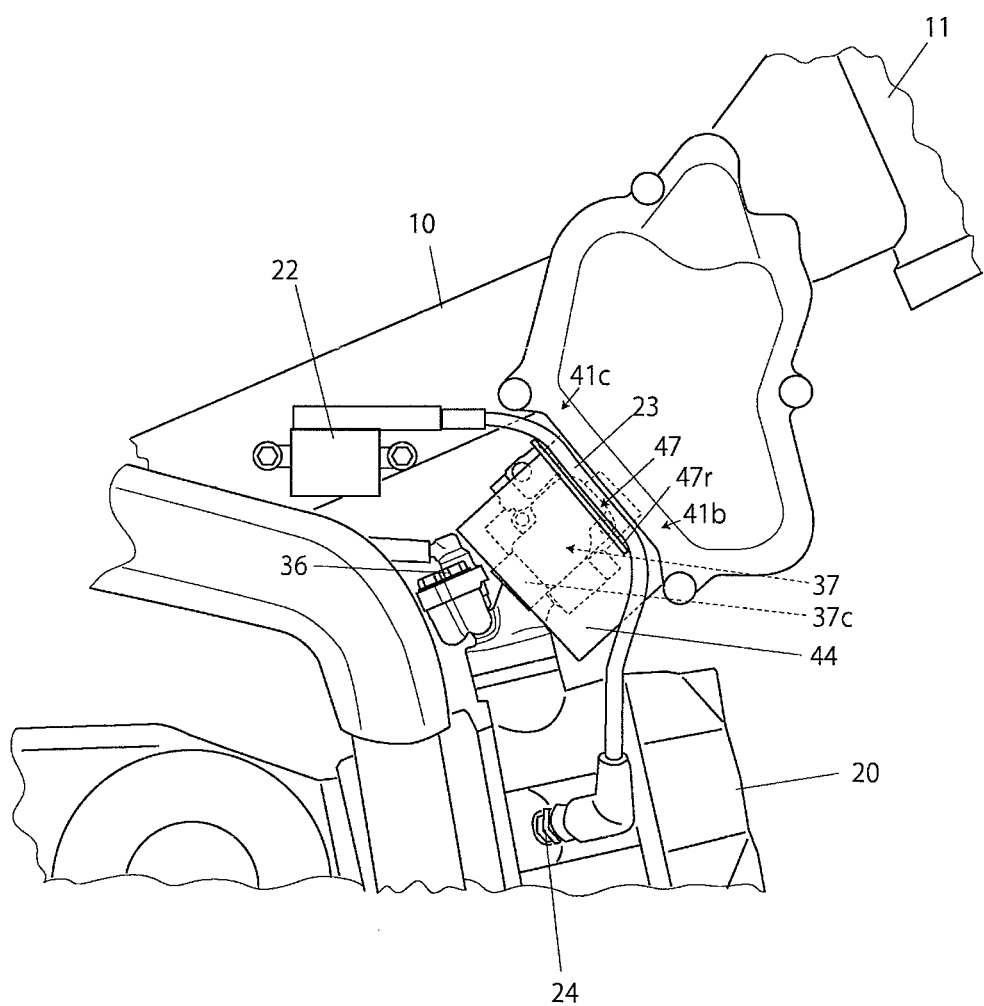
FIG. 7 is a partially enlarged view of FIG. 2.
Figure 10:
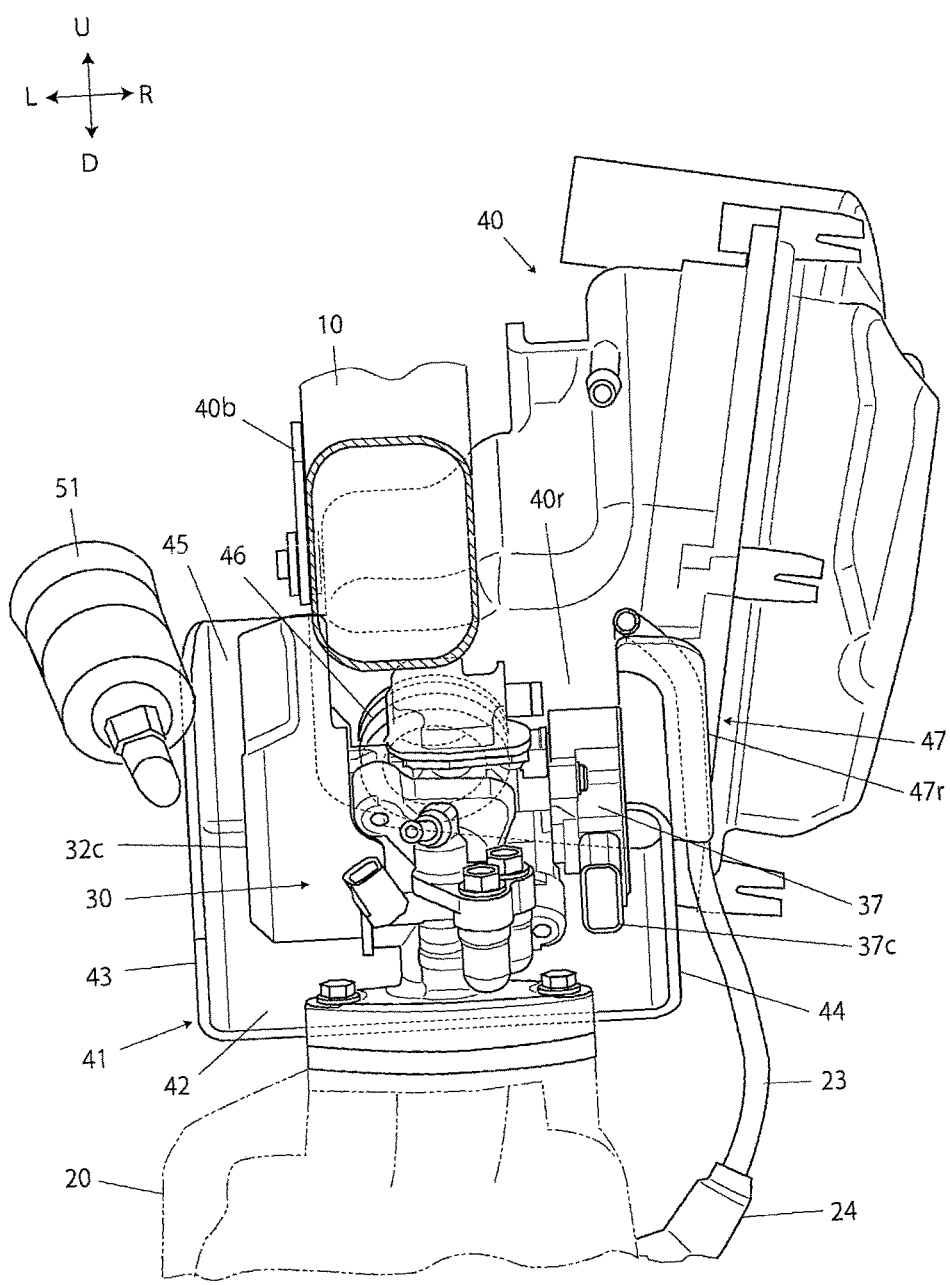
FIG. 10 is a partially enlarged cross-sectional view that is taken along 10-10 in FIG. 1.

As depicted in FIGS. 6, 7, and 10, the right side wall 44 of the throttle body protecting section 41 covers substantially the entire right sides of a throttle opening sensor 37 and a connector section 37c thereof that are provided on the right side of the throttle body 30.

The air cleaner 40 is attached to a main frame 10 of the vehicle body via a bracket 40b (FIGS. 4, 8, 9 and 10).

As depicted in FIG. 1, a head pipe 11 is provided at a tip of the main frame 10, front forks 5 are supported by the head pipe 11 in a manner to be steerable by a handlebar 5h, and a front wheel WF is supported at tips of the front forks 5.

A left and right pair of pivot frames 12 extend downwardly and is provided in a rear section of the main frame 10 with a swing arm 13 being swingably supported at a pivot 12p by the pivot frame 12. A rear wheel WR is supported at a rear end of the swing arm 13. The rear wheel WR is driven by the internal combustion engine 20 that is supported by the main frame 10.

Figure 2:
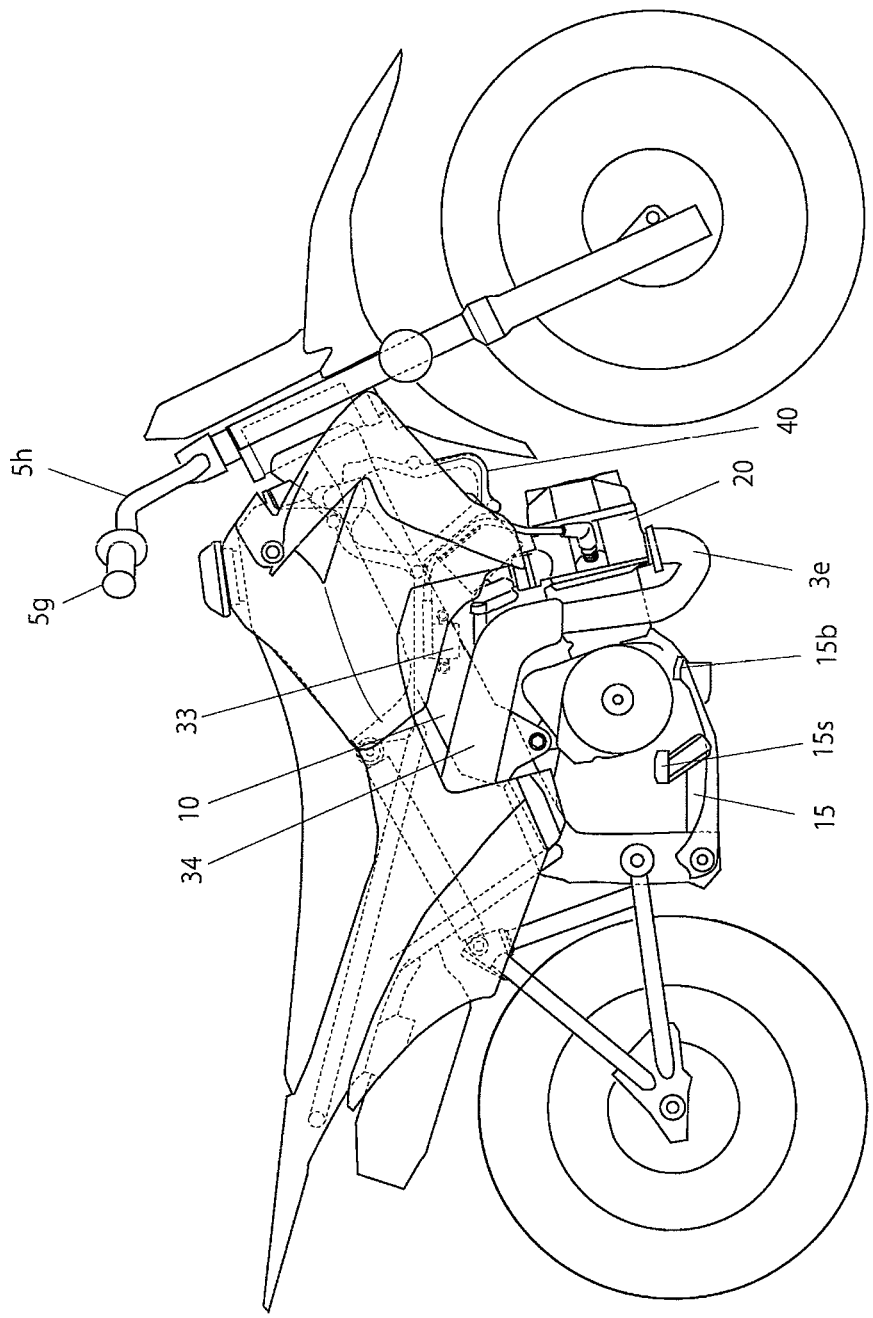
FIG. 2 is a right side view of the same.

A fuel tank 2 is provided together with a seat 5 on which a rider is seated. The seat 5 is supported by a rear frame 14 that extends rearwardly from the rear section of the main frame 10. A bottom frame 15 is provided in front of a lower end of the pivot frame 12, and the bottom frame 15 is provided with a step 15s on which the rider places his/her foot. As illustrated in FIG. 2, a change pedal 16 and a brake pedal 15b are provided.

As depicted in FIGS. 4 and 6, the throttle body 30 includes a throttle drum 32 for actuating the throttle valve 31 in a side section (a left side section in the drawing).

The throttle drum 32 is arranged to project to the side (to the left in the drawing) of the air cleaner 40 in the rear view (FIG. 6). The throttle body protecting section 41 has a front wall 45 for covering a front section 32f of the throttle drum 32.

While a capacity of the air cleaner 40 can easily be secured by projecting the throttle drum 32 in the side section of the throttle body 30 to the side of the air cleaner 40 in the rear view, the throttle drum 32 can be protected by the throttle body protecting section 41.

As it is apparent from FIGS. 4 and 10, the throttle body protecting section 41 covers substantially the entire front and lower sides of the throttle body 30.

Figure 8:
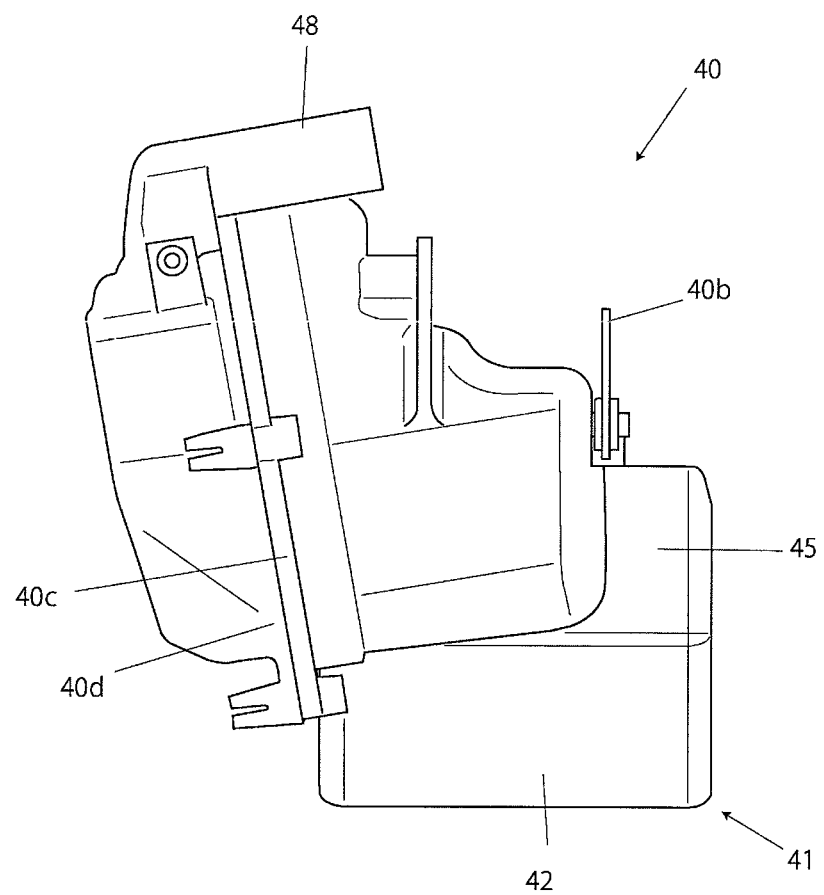
FIG. 8 is a view of an air cleaner that is seen from the front.
Figure 9:
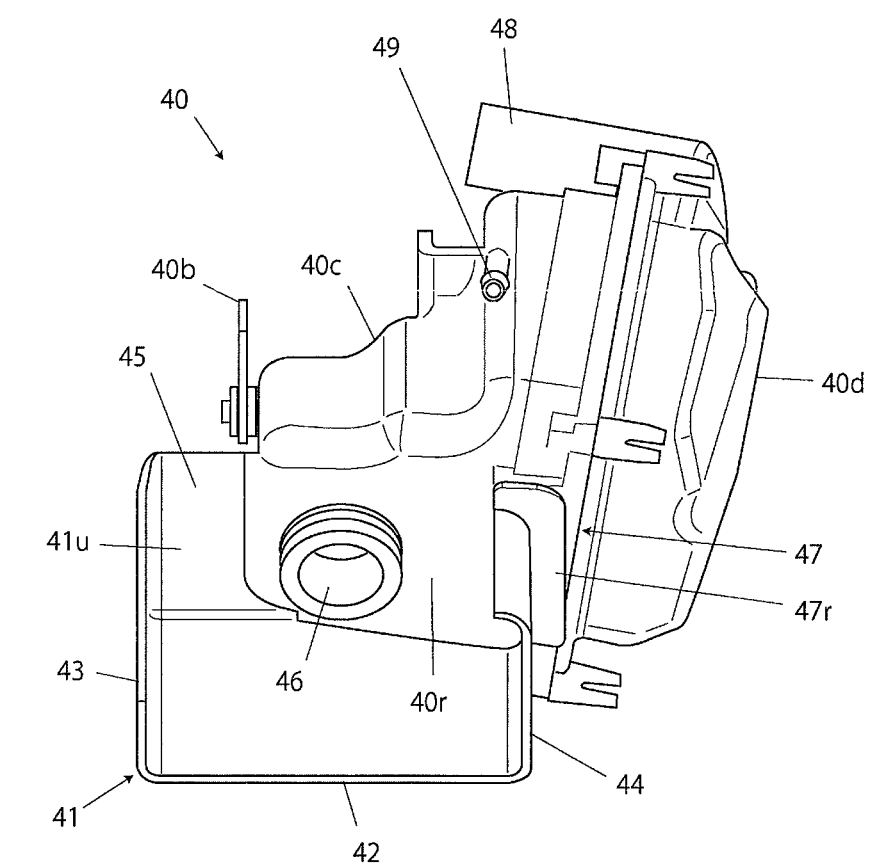
FIG. 9 is a view of the air cleaner that is seen from the rear.

In FIGS. 8 and 9, a dirty-side case 40d is provided for constituting a dirty side of the air cleaner 40 with a clean-side case 40c being provided for constituting a clean side of the air cleaner 40. An intake duct 48 is provided together with a return port 49 which is connected to the internal combustion engine 20 and through which blow-by gas from the internal combustion engine 20 is returned.

In FIG. 4, a throttle wire 33 is provided for a turning operation of the throttle drum 32 with the throttle wire being connected to a throttle grip 5g (FIG. 2) that is operated by the rider.

A cover 32c is provided for covering the throttle drum 32 and holding the throttle wire 33.

As depicted in FIGS. 5 and 9, a connection section 46 to an intake passage 34 of the throttle body 30 is provided in the rear surface (rear wall) 40r of the air cleaner 40.

The intake passage 34 of the throttle body 30 can directly be connected to the air cleaner 40. Thus, the intake of the air can be smoothed.

As depicted in FIG. 5, an exhaust passage 35 of the throttle body 30 is provided on a downstream side of the throttle valve 31, and the exhaust passage 35 is connected to the intake port 21 of the internal combustion engine 20.

A fuel injection device 36 is provided in the exhaust passage 35 of the throttle body 30.

Figure 3:
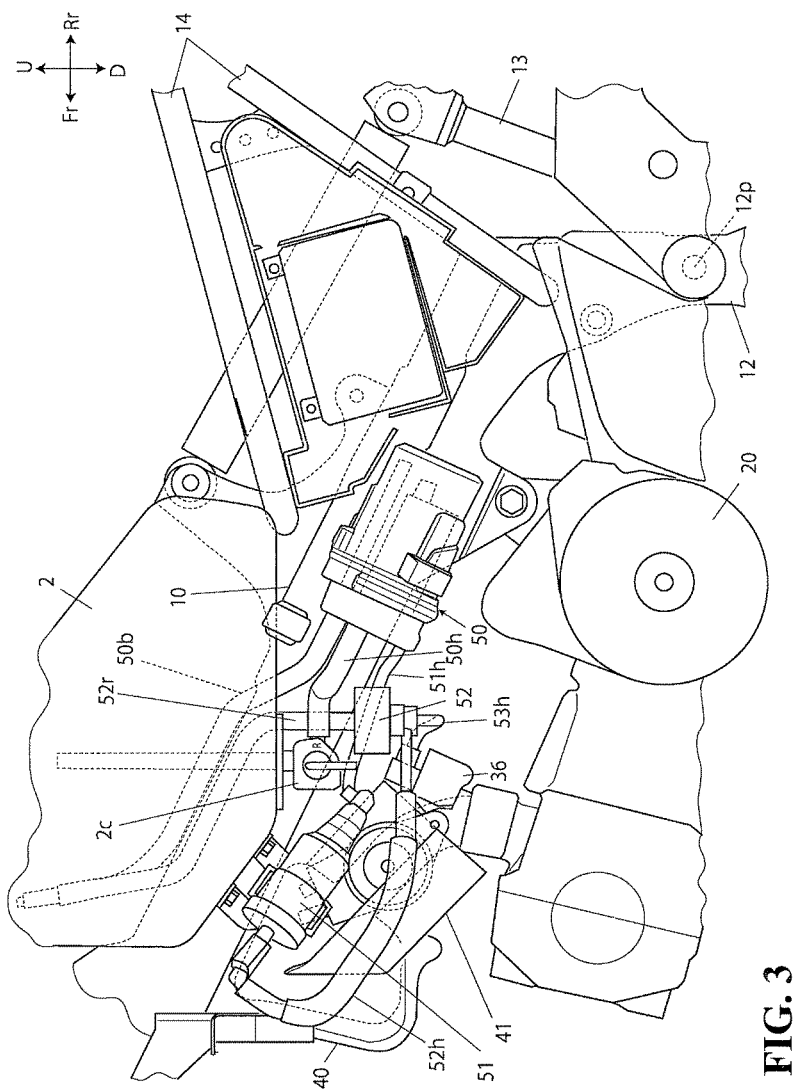
FIG. 3 is a partially enlarged view of FIG. 1.

In FIG. 3, a fuel pump 50 supplies fuel in a fuel tank 2 to the fuel injection device 36 via a fuel filter 51 and a pressure regulator 52.

A fuel hose 50h is provided for connecting a fuel cock 2c of the fuel tank 2 and the fuel pump 50. A fuel hose 51h is provided for connecting the fuel pump 50 and the fuel filter 51. A fuel hose 52h is provided for connecting the fuel filter 51 and the pressure regulator 52 and a fuel hose 53h is provided for connecting the pressure regulator 52 and the fuel injection device 36.

A breather hose 50b is provided for keeping the inside of the fuel pump 50 at atmospheric pressure. One end thereof is connected to the fuel pump 50, and the other end thereof is opened to the inside of the fuel tank 2.

A return hose 52r is provided for returning a surplus of the fuel to the fuel tank 2 when pressure of the fuel becomes a specified pressure or higher in the pressure regulator 52. One end thereof is connected to the pressure regulator 52, and the other end thereof is opened to the inside of the fuel tank 2.

As depicted in FIGS. 6, 7, and 10, on an outer circumferential surface of the throttle body protecting section 41, the throttle body protecting section 41 has, a wire positioning section 47 for positioning a high-voltage wire 23 that leads to an ignition coil 22.

With such a configuration, the high-voltage wire 23, which leads to the ignition coil 22, can be prevented from contacting the other components.

An ignition plug 24 is connected to the ignition coil 22 by the high-voltage wire 23.

The wire positioning section 47 is provided at a position that is in front of the ignition coil 22 and is separated from the ignition coil 22.

Thus, a state where the high-voltage wire 23 is bent immediately after being drawn out of the ignition coil 22 can be prevented. In addition, the application of a load on the ignition coil 22 can be restricted.

The wire positioning section 47 has a rib 47r that is provided over an upper end 41c and a lower end 41b of the outer circumferential surface of the throttle body protecting section 41.

The high-voltage wire 23 can be positioned in a manner to stretch vertically and thus can further reliably be positioned.

An embodiment of the invention has been described so far. However, the invention is not limited to the above embodiment and can appropriately be modified within the scope of the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
a throttle body provided with a throttle valve for controlling a flow rate of intake air into an internal combustion engine; and
an air cleaner for supplying air to the throttle body;
wherein the throttle body is arranged at a rear of the air cleaner, an intake port of the internal combustion engine is arranged at a rear of the throttle body, and the air cleaner includes a throttle body protecting section for covering at least a lower surface of the throttle body.

2. The motorcycle according to claim 1, wherein the throttle body protecting section is in a U-shape in a rear view that has a bottom wall for covering the lower surface of the throttle body and side walls that respectively extend upwardly from left and right of the bottom wall and cover left and right sides of the throttle body, and an upper side and a rear side thereof are opened.

3. The motorcycle according to claim 2, wherein:
the throttle body includes a throttle drum for actuating the throttle valve in a side section;
the throttle drum is arranged to be projected to a side of the air cleaner in the rear view; and
the throttle body protecting section has a front wall for protecting a front section of the throttle drum.

4. The motorcycle according to claim 2, wherein a connection section to an intake passage of the throttle body is provided in a rear surface of the air cleaner.

5. The motorcycle according to claim 2, wherein the throttle body protecting section has, on an outer circumferential surface of the throttle body protecting section, a wire positioning section for positioning a high-voltage wire that leads to an ignition coil.

6. The motorcycle according to claim 1, wherein:
the throttle body includes a throttle drum for actuating the throttle valve in a side section;
the throttle drum is arranged to be projected to a side of the air cleaner in the rear view; and
the throttle body protecting section has a front wall for protecting a front section of the throttle drum.

7. The motorcycle according to claim 6, wherein a connection section to an intake passage of the throttle body is provided in a rear surface of the air cleaner.

8. The motorcycle according to claim 1, wherein a connection section to an intake passage of the throttle body is provided in a rear surface of the air cleaner.

9. The motorcycle according to claim 1, wherein the throttle body protecting section has, on an outer circumferential surface of the throttle body protecting section, a wire positioning section for positioning a high-voltage wire that leads to an ignition coil.

10. The motorcycle according to claim 9, wherein the wire positioning section is provided at a position that is in front of the ignition coil and is separated from the ignition coil.

11. The motorcycle according to claim 10, wherein the wire positioning section has a rib that is provided from an upper end to a lower end of the outer circumferential surface of the throttle body protecting section.

12. The motorcycle according to claim 9, wherein the wire positioning section has a rib that is provided over an upper end and a lower end of the outer circumferential surface of the throttle body protecting section.

13. A cover for a throttle body adapted to be used with a motorcycle comprising:
   a throttle body;
   a throttle valve operatively connected to the throttle body, said throttle valve controlling a flow rate of intake air;
   an air cleaner for supplying air to the throttle body, said throttle body being arranged at a rear of the air cleaner;
   an intake port of an internal combustion engine, said intake port being arranged at a rear of the throttle body, and
   a throttle body protecting section being included in the air cleaner, said throttle body protecting section covering at least a lower surface of the throttle body.

14. The cover for a throttle body adapted to be used with a motorcycle according to claim 13, wherein the throttle body protecting section is in a U-shape in a rear view that has a bottom wall for covering the lower surface of the throttle body and side walls that respectively extend upwardly from left and right of the bottom wall and cover left and right sides of the throttle body, and an upper side and a rear side thereof are opened.

15. The cover for a throttle body adapted to be used with a motorcycle according to claim 13, wherein:
   the throttle body includes a throttle drum for actuating the throttle valve in a side section;
   the throttle drum is arranged to be projected to a side of the air cleaner in the rear view; and
   the throttle body protecting section has a front wall for protecting a front section of the throttle drum.

16. The cover for a throttle body adapted to be used with a motorcycle according to claim 13, wherein a connection section to an intake passage of the throttle body is provided in a rear surface of the air cleaner.

17. The cover for a throttle body adapted to be used with a motorcycle according to claim 13, wherein the throttle body protecting section has, on an outer circumferential surface of the throttle body protecting section, a wire positioning section for positioning a high-voltage wire that leads to an ignition coil.

18. The cover for a throttle body adapted to be used with a motorcycle according to claim 17, wherein the wire positioning section is provided at a position that is in front of the ignition coil and is separated from the ignition coil.

19. The cover for a throttle body adapted to be used with a motorcycle according to claim 18, wherein the wire positioning section has a rib that is provided from an upper end to a lower end of the outer circumferential surface of the throttle body protecting section.

20. The cover for a throttle body adapted to be used with a motorcycle according to claim 17, wherein the wire positioning section has a rib that is provided over an upper end and a lower end of the outer circumferential surface of the throttle body protecting section.

* * * * *